United States Patent
De Jong et al.

(10) Patent No.: US 10,464,784 B2
(45) Date of Patent: Nov. 5, 2019

(54) ELEVATOR CAR ARRANGEMENT AND METHOD FOR DAMPENING VIBRATIONS

(71) Applicant: KONE Corporation, Helsinki (FI)

(72) Inventors: Johannes De Jong, Järvenpää (FI); Gabriela Roivainen, Hyvinkää (FI); Jussi Perälä, Hyvinkää (FI); Jouni Ratia, Hyvinkää (FI)

(73) Assignee: KONE CORPORATION, Helsinki (FI)

( * ) Notice: Subject to any disclaimer, the term of this patent is extended or adjusted under 35 U.S.C. 154(b) by 326 days.

(21) Appl. No.: 15/357,546

(22) Filed: Nov. 21, 2016

(65) Prior Publication Data

US 2017/0158466 A1     Jun. 8, 2017

(30) Foreign Application Priority Data

Dec. 2, 2015  (EP) .................................. 15197530

(51) Int. Cl.
  *B66B 11/02*   (2006.01)
  *B66B 19/00*   (2006.01)
  *F16F 15/08*   (2006.01)

(52) U.S. Cl.
  CPC ........ *B66B 11/0273* (2013.01); *B66B 19/007* (2013.01); *F16F 15/08* (2013.01)

(58) Field of Classification Search
  CPC ..... B66B 7/10; B66B 11/026; B66B 11/0266; B66B 11/0273; F16F 15/08
  See application file for complete search history.

(56) References Cited

U.S. PATENT DOCUMENTS

| | | | | |
|---|---|---|---|---|
| 1,380,125 A | * | 5/1921 | Turner | B66B 7/10 187/412 |
| 2,147,660 A | * | 2/1939 | Loewus | F16F 1/3732 248/613 |
| 4,428,460 A | * | 1/1984 | Luinstra | B66B 11/0273 187/411 |
| 4,865,157 A | * | 9/1989 | Sissala | B66B 11/0273 187/410 |
| 5,325,937 A | | 7/1994 | Suchodolski et al. | |
| 5,409,283 A | * | 4/1995 | Ban | B62D 24/02 180/312 |

(Continued)

FOREIGN PATENT DOCUMENTS

| | | |
|---|---|---|
| GB | 1407158 A | 9/1975 |
| JP | 51-10768 U | 1/1976 |

*Primary Examiner* — Minh Truong
(74) *Attorney, Agent, or Firm* — Birch, Stewart, Kolasch & Birch, LLP (57) ABSTRACT

An elevator car arrangement includes an elevator car body and an elevator car sling. The elevator car arrangement further includes a hanging damper arranged to connect the elevator car body and the elevator car sling together for dampening vibrations coming from guide rails through the elevator car sling to the elevator car body. The hanging damper includes a first part connected to a bottom part of the elevator car body; a second part connected to the elevator car sling; and a damping element arranged to dampen vibrations coming from the second part to the first part. A method for dampening vibrations coming from guide rails through the elevator car sling to the elevator car body is disclosed.

15 Claims, 4 Drawing Sheets

(56) References Cited

U.S. PATENT DOCUMENTS

| | | | | |
|---|---|---|---|---|
| 5,564,530 | A * | 10/1996 | Iwakiri | B66B 7/08 |
| | | | | 187/348 |
| 7,398,655 | B2 * | 7/2008 | Yun | F16F 15/067 |
| | | | | 181/403 |
| 8,960,377 | B2 * | 2/2015 | Zhang | B66B 7/08 |
| | | | | 187/411 |
| 9,718,644 | B2 * | 8/2017 | Kyue | B66B 11/0226 |
| 9,834,412 | B2 * | 12/2017 | Roivainen | B66B 11/0273 |
| 2006/0175152 | A1 * | 8/2006 | Fargo | B66B 7/085 |
| | | | | 187/412 |
| 2016/0001976 | A1 * | 1/2016 | Nagamine | B65G 1/02 |
| | | | | 211/71.01 |

* cited by examiner

ELEVATOR CAR ARRANGEMENT AND METHOD FOR DAMPENING VIBRATIONS

FIELD OF THE INVENTION

The invention relates to an isolation of an elevator car, in particular to an arrangement for isolating elevator car from vibrations coming from guide rails for improving ride comfort of an elevator. The invention relates in particularly to an elevator car arrangement comprising an elevator car body and an elevator car sling and a method for dampening vibrations.

BACKGROUND OF THE INVENTION

Usually in elevators the elevator car body is generally fitted inside an elevator car sling, which the elevator car sling is suspended by hoisting roping and fitted to travel along guide rails. The guide rails are formed by connecting successive guide rail members together such that joints are formed in the assembled guide rails. These joints and possible impreciseness in guide rail alignment causes vibrations to the elevator car body via the elevator car sling connected to the elevator car body. This means that ride comfort in the elevator suffers and noise increases, which is especially the case with high speed elevators. Ride comfort for high speed elevators is very much influenced by the interface between the elevator car and the sling.

Base isolation is a well-known principle in the construction industry and is usually used to protect buildings against earthquake. Sometimes it is even used in server rooms to protect computer equipment against earthquake. The principle is to use a relatively low frequency base so that ground movement has very little effect on the movement of the building. However this cannot be used as such in elevators because as a difference between elevators and buildings, buildings are not coupled at the top to the ground which is the case with elevators in which the elevator car body is fixed to the elevator car sling at the top of the elevator car body, and thus it is coupled to the rail also at the top.

In prior art depending on the load of the elevator car several springs are used for isolating the floor of an elevator car body from the elevator car sling. The top of the elevator car has to be additionally supported because a top fixing limits the movement of the elevator car in case of emergency braking and also it is needed for supporting the tilted elevator car due to doors, toe guard and inner decoration.

BRIEF DESCRIPTION OF THE INVENTION

An object of the present invention is to provide an elevator car arrangement and a method for dampening vibrations so as to overcome the above problems. The objects of the invention are achieved by an arrangement and a method which are characterized by what is stated in the independent claims. The preferred embodiments of the invention are disclosed in the dependent claims.

The invention is based on the idea of providing a base isolation type of a protection for an elevator car for reducing vibrations caused by guide rails to the elevator car body. According to the invention the elevator car arrangement comprises a hanging damper arranged to connect the elevator car body and the elevator car sling together for dampening vibrations coming from guide rails through the elevator car sling to the elevator car body. The hanging damper is a pendulum that keeps the car as straight as possible, keeps the frequency low and prevents most resonances coming to the elevator car body.

According to the invention an elevator car arrangement comprises an elevator car body and an elevator car sling and further a hanging damper arranged to connect the elevator car body and the elevator car sling together for dampening vibrations coming from guide rails through the elevator car sling to the elevator car body. The hanging damper comprises a first part connected to a bottom part of the elevator car body; a second part connected to the elevator car sling; and a damping element arranged to dampen vibrations coming from the second part to the first part. The first part comprises a first rod and a first plate connected together, said first rod having a first end connected to the bottom part of the elevator car body and a second end connected to the first plate. The second part comprises a second plate and at least one second rod in connection with the second plate. The damping element is arranged between the first plate of the first part and the second plate of the second part such that the damping element has a connection with the first plate of the first part and the second plate of the second part such that the connection between the first part and the second part is arranged through the damping element.

According to the invention the method for dampening vibrations coming from guide rails through the elevator car sling to the elevator car body comprises the steps of providing a hanging damper comprising a first part and a second part between the elevator car body and the elevator car sling by connecting the first part to a bottom part of the elevator car body, said first part comprising a first rod and a first plate connected together, said first rod having a first end to be connected to the bottom part of the elevator car body and a second end connected to the first plate; connecting the second part to the elevator car sling, said second part comprising a second plate and at least one second rod in connection with the second plate, said second rod having a first end and a second end; arranging a damping element between the first plate of the first part and the second plate of the second part to have a connection with the first plate of the first part and the second plate of the second part to dampen vibrations coming from the second part to the first part; and connecting the first part and the second part together through the damping element.

Ride comfort of the elevator car means that there is not much vibrations or noise that comes from the interface between the elevator car body and the elevator car sling. A better isolated elevator car means that the excitations coming from guide rail misalignments, ropes vibrations, dynamic unbalance due to variable compensating and travelling cables are not transmitted to a floor or to a roof of the elevator car body. An advantage that an interface between the elevator car body and the elevator car sling comprises also at least one damping element is that the vibrations of the elevator car due to wind loads, i.e. turbulences due to protuberances in the car outer surface; big changes in the clearance between the elevator car and the shaft when passing landing doors or counterweight, have smaller amplitude and die faster. An advantage is that an elevator car body and an elevator car sling interface having a damping element decreases the lateral vibrations and also the structure borne noise.

An advantage of the invention is that the hanging damper is easy to install by connecting it between a beam of an elevator car body and a beam of an elevator car sling in which it is also easy to maintain without a need for disassembling the elevator car body or the elevator car sling. Also there is a possibility to add and/or remove additional mass to the hanging damper without disassembling the car body or the sling. There is also no danger destroying the elevator if the additional mass accidentally falls because the additional mass is not fixed on top of the elevator car or to the walls of the elevator car.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
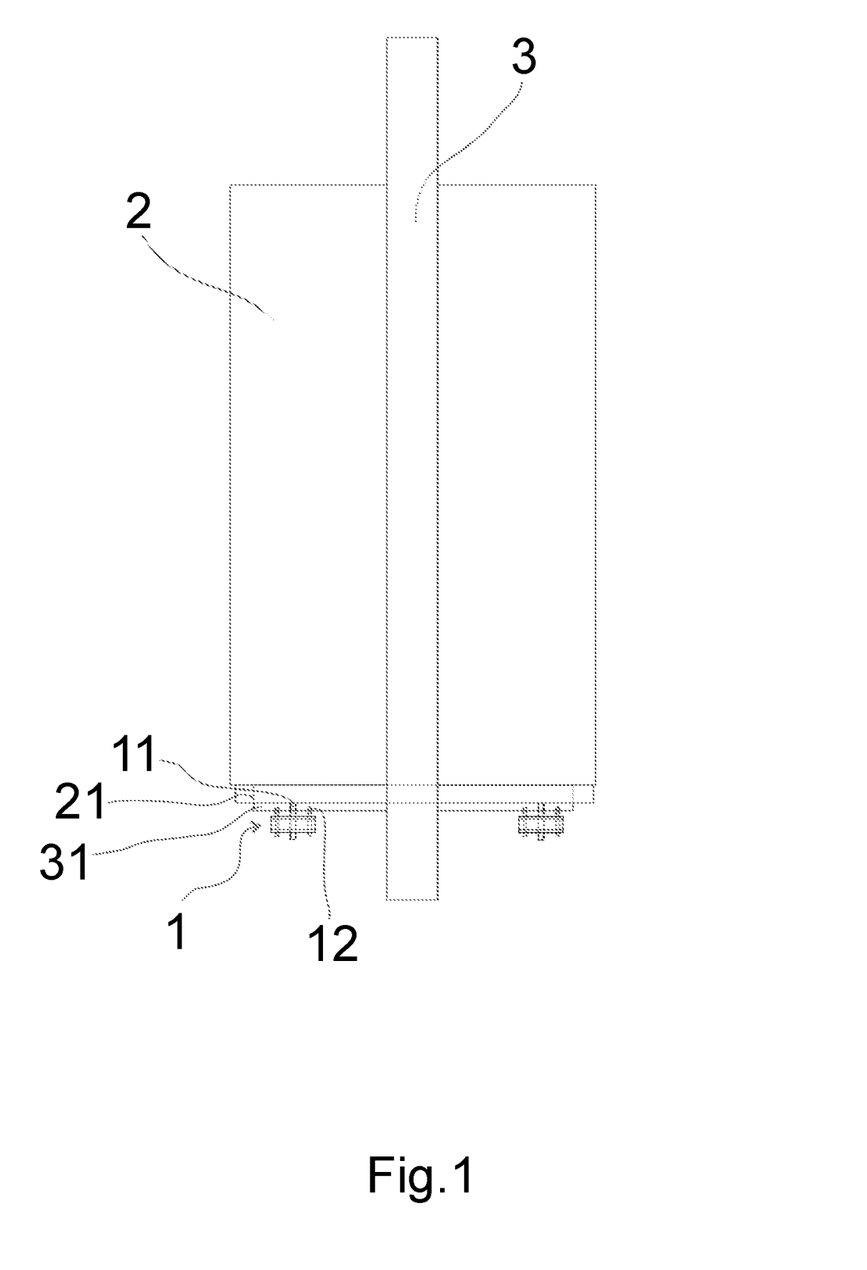
FIG. 1 shows a profile an elevator car arrangement according to the invention shown from side of the elevator.

FIG. 1 shows a profile an elevator car arrangement according to the invention in which the elevator car arrangement comprises an elevator car body 2 and an elevator car sling 3. The elevator car arrangement further comprises a hanging damper 1 arranged to connect the elevator car body 2 and the elevator car sling 3 together for dampening vibrations coming from guide rails through the elevator car sling 3 to the elevator car body 2. The hanging damper 1 is especially arranged to connect the lower part of the elevator car body 2 to the elevator car sling 3. In a preferred embodiment of the invention the elevator car arrangement comprises four hanging dampers 1, two arranged on both sides of the elevator car, i.e. two on each side of the elevator car body 2. As the FIG. 1 is a side view of the elevator car arrangement it only shows two hanging dampers 1 when the two other hanging dampers 1 are arranged on the other side of the elevator car.

FIG. 1 shows the hanging damper 1 in a simplified form in which the hanging damper comprises a first part 11 connected to a bottom part of the elevator car body 2 and a second part 12 connected to the elevator car sling 3. More accurately the first part 11 is connected to a beam 21 of an elevator car body 2 and the second part is connected to a beam 31 of an elevator car sling 3.

Figure 2:
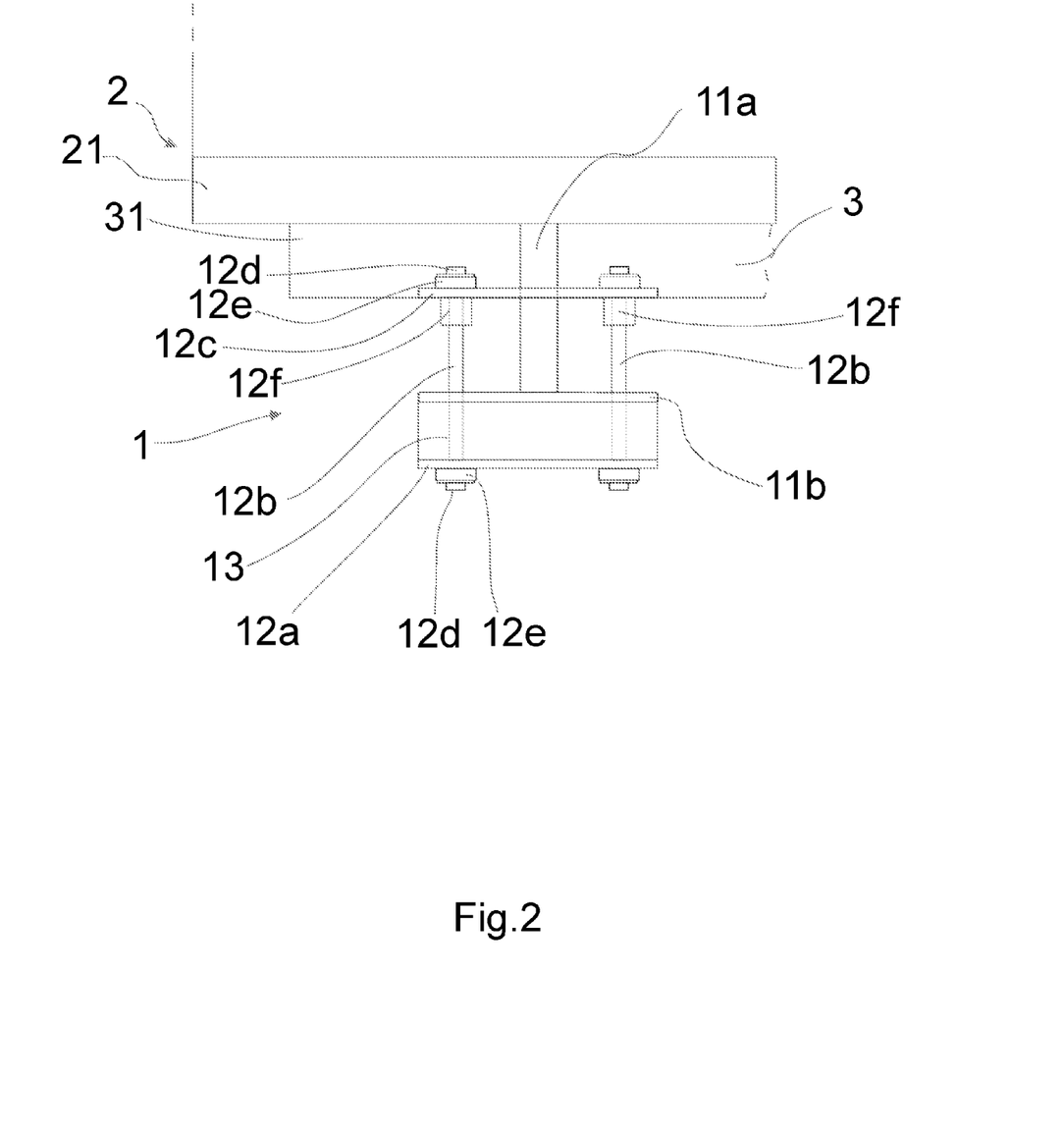
FIG. 2 shows an embodiment of a hanging damper of the elevator car arrangement according to the invention from the same perspective as FIG. 1.

FIG. 2 shows an embodiment of a hanging damper 1 of the elevator car arrangement according to the invention as seen from a side of the elevator car. In other words the hanging damper 1 shown in FIG. 1 is a detail from FIG. 1. The hanging damper 1 is arranged to connect the elevator car body 2 and the elevator car sling 3 together for dampening vibrations coming from guide rails through the elevator car sling 3 to the elevator car body 2. The hanging damper 1 comprises a first part 11 connected to a bottom part of the elevator car body 2, a second part 12 connected to the elevator car sling 3 and a damping element 13 arranged to dampen vibrations coming from the second part 12 to the first part 11. The hanging damper 1 can be seen in detail in FIG. 4 which is an exploded view of the hanging damper shown in FIG. 2. The first part 11 comprises a first rod 11a and a first plate 11b connected together, said first rod 11a having a first end 11a1 connected to the bottom part of the elevator car body 2 and a second end 11a2 connected to the first plate 11b. The second part 12 comprises a second plate 12a and at least one second rod 12b in connection with the second plate 12a. As shown in the FIGS. 2 and 3 the second part 12 comprises in this embodiment two second rods 12b. The damping element 13 is arranged between the first plate 11b of the first part 11 and the second plate 12a of the second part 12 such that the damping element 13 has a connection with the first plate 11b of the first part 11 and the second plate 12a of the second part 12 such that the connection between the first part 11 and the second part 12 is arranged through the damping element 13. The hanging damper 1 is connected to the bottom part of the elevator car such that the first rod 11a is connected to a beam 21 of the elevator car body 2 and the second rod 12b is having a connection with a beam 31 of the elevator car sling 3. In a preferred embodiment of the invention the connection between the first rod 11a and the elevator car body 2 is a threaded connection.

As shown in FIG. 2 the second rod 12b is arranged to go through the first plate 11b and the damping element 13 to have a connection with the second plate 12a. This means that the first plate 11b and the damping element 13 are provided with a hole for the second rod 12b to go through. The hole in the first plate 11b is preferably large enough in diameter so that the second rod 12b does not touch the first plate 11b. As further can be seen from FIG. 2 the connection between the second rod 12b and the beam 31 of the elevator car sling 3 is a thread nut fixing in connection with the beam 31. The thread nut fixing is preferably arranged such that there is at least one baseplate 12c between the nut 12d and the beam 31. The baseplate 12c can be such that it is common for at least two second rods 12b and is arranged to extend around the first rod 11a such that the baseplate 12c has a hole for the first rod 11a and holes for the at least two second rods 12b or in another embodiment the second rods 12b may have separate baseplates 12c in which case the baseplate does not extend to the area of the first rod 11a. A rubber bushing 12f or a bushing 12f of some other elastic material is preferably provided between the second rod 12b and the beam 31 such that the second rod 12b and the beam 31 are not in a direct connection together. The first rod 11a is arranged to go through the beam 31 of the elevator car sling 3 without having a connection with the sling 3. This means that there is a hole in the beam 31 of the elevator car sling 3 which is large enough in diameter so that the first rod 11a does not touch the beam 31 or the first rod 11a may have a narrowing section in the area of the hole where the first rod 11a goes through the beam 31. The damping element 13 preferably comprises rubber or polyurethane or some other suitable material.

The hanging damper 1 may comprise a post for an additional mass to be added to the elevator car arrangement. This is advantageous when needing to balance the elevator car body 2 easily. The additional mass can be added for example through a magnetic connection on the first plate 11b.

The first part 11 comprises a first rod 11a and a first plate 11b connected together, said first rod 11a having a first end Ha1 to be connected to the bottom part of the elevator car body 2 and a second end 11a2 connected to the first plate 11b and the second part 12 comprises a second plate 12a and at least one second rod 12b in connection with the second plate 12a, said second rod 12b having a first end 12b1 and a second end 12b2.

In the method according to the invention the method comprises the steps of providing a hanging damper 1 comprising a first part 11 and a second part 12 between the elevator car body 2 and the elevator car sling 3 by connecting the first part 11 to a bottom part of the elevator car body 2, connecting the second part 12 to the elevator car sling 3, arranging a damping element 11 between the first plate 11b of the first part 11 and the second plate 12a of the second part 12 to have a connection with the first plate 11b of the first part 11 and the second plate 12a of the second part 12 to dampen vibrations coming from the second part 12 to the first part 11; and connecting the first part 11 and the second part 12 together through the damping element 11.

The step of connecting the first part 11 to a bottom part of the elevator car body 2 comprises the steps of arranging the first rod 11a to go through a beam 31 of the elevator car sling 3 and connecting the first end 11a1 of the first rod 11a to a beam 21 of the elevator car body 2.

The step of connecting the second part 12 to the elevator car sling 3 comprises the steps of arranging the at least one second rod 12b through a hole in a beam 31 of the elevator car sling 3 such that the first end 12b1 and the second end 12b2 are on different sides of the beam 31 or on different sides of part of the beam 31; providing a nut 12d to the first end 12b1 of the second rod 12b and tightening the nut 12d. The step of connecting the second part 12 to the elevator car sling 3 may further comprise a step of arranging a baseplate 12c on the elevator car sling 3 to the side of the elevator car body 2 such that the second rod 12b goes through a hole in the baseplate 12c, i.e. arranging a baseplate 12c between the beam 31 and the nut 12d.

The step of arranging a damping element 11 between the first plate 11b of the first part 11 and the second plate 12a of the second part 12 comprises the steps of providing a hole in the damping element 11 for the at least one second rod 12b to go through the damping element 11; arranging the damping element 11 in connection with the first plate 11b such that the second rod 12b goes through the damping element 11; arranging the second plate 12a in connection with the damping element 11, said second plate 12a having a hole for the second rod 12b to go through the second plate 12a; and tightening a nut 12d to the second end 12b2 of the second rod 12b.

The method further comprises a step of adding mass to the hanging damper 1 for balancing the elevator car body 2.

Figure 3:
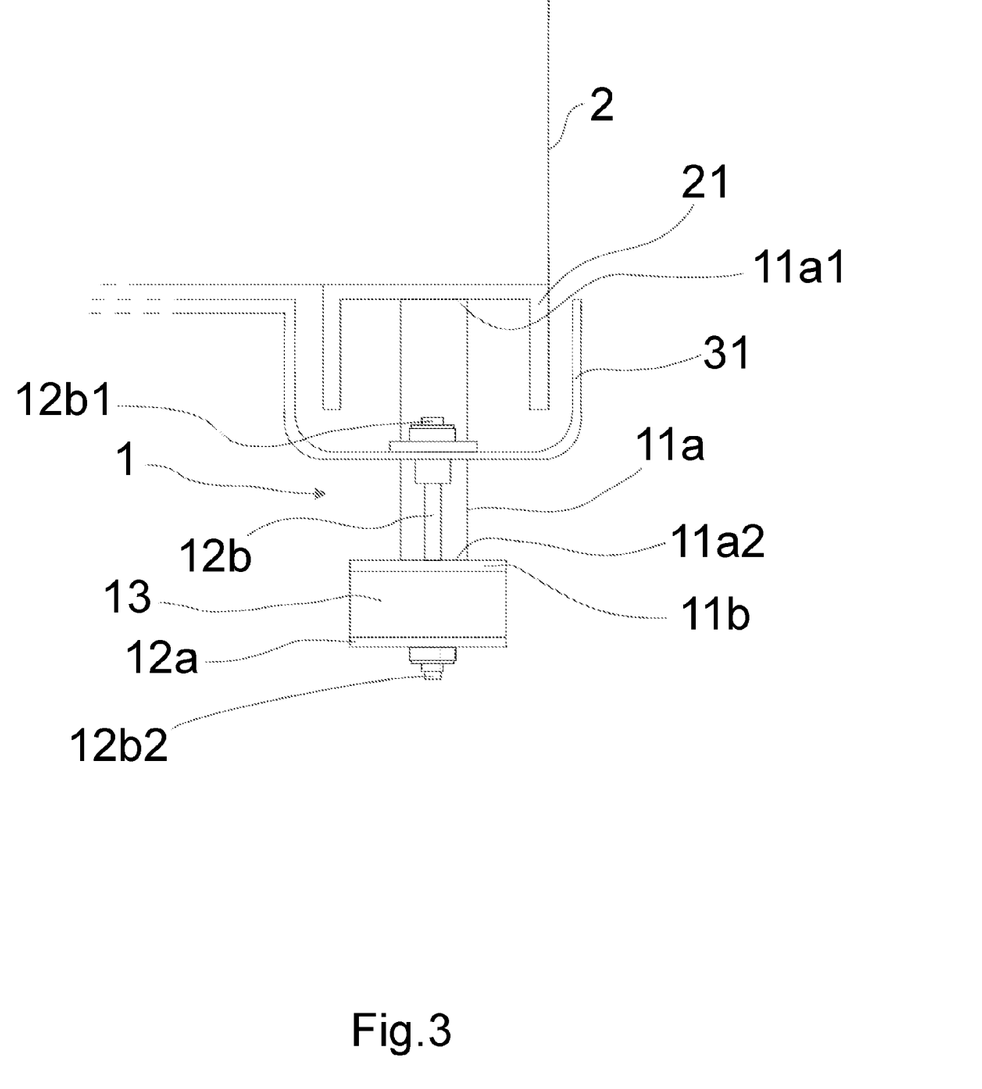
FIG. 3 shows an embodiment of a hanging damper from the front side of the elevator.
Figure 4:
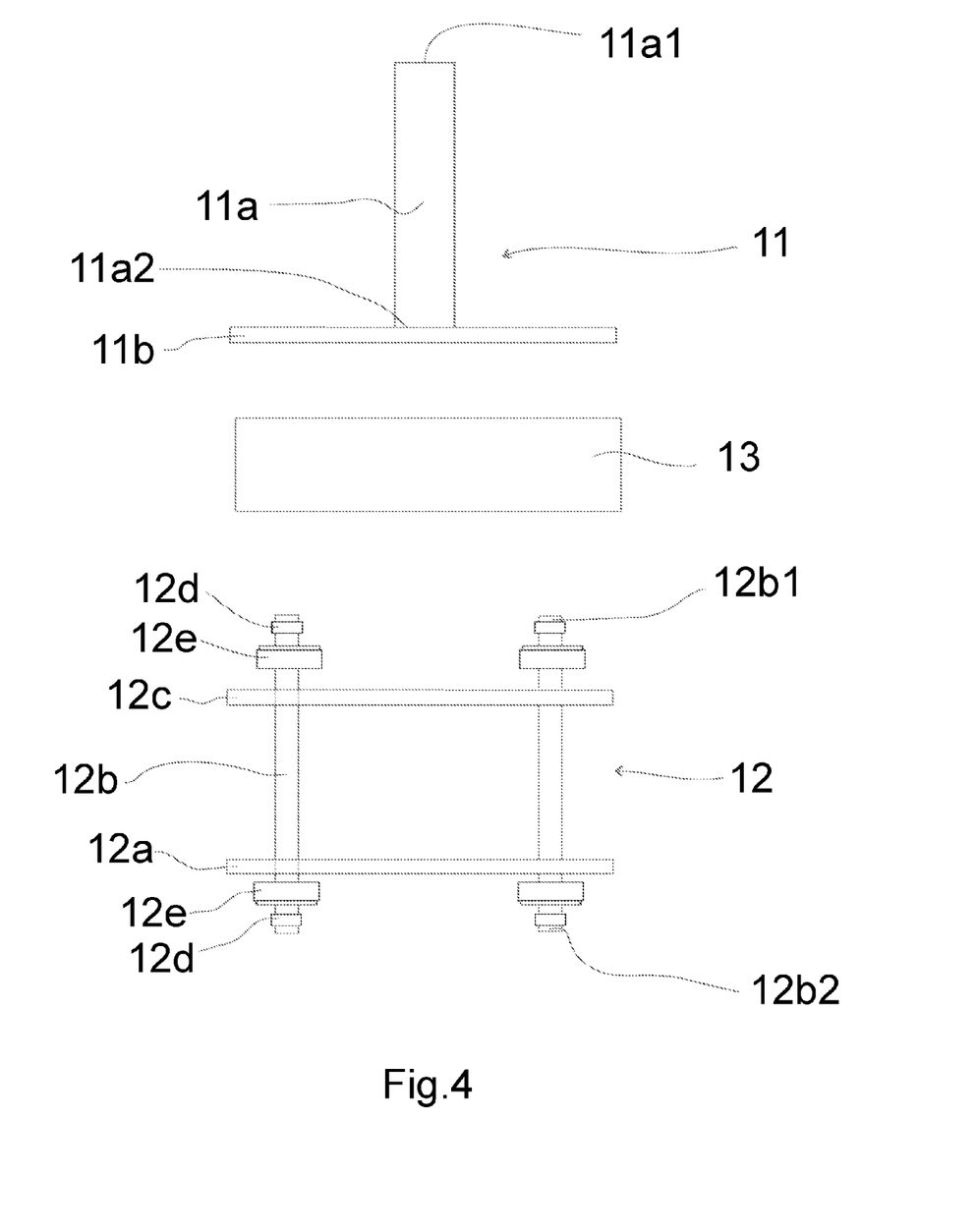
FIG. 4 shows an exploded view of the hanging damper shown in FIG. 2.

FIG. 3 shows the hanging damper 1 as seen from the front side of the elevator car. The elevator car comprising the elevator car body 2 and the elevator car sling 3 together with corresponding beams is simplified and only parts that are meaningful for the hanging damper 1 and its connections are shown in the figure. The elevator car body 2 comprises a beam 21 in which the first end 11a1 of the first rod 11a of the hanging damper 1 is connected. The connection is preferably a threaded connection. The connection between the first end 11a1 of the first rod 11a and the elevator car body 2 is the only connection between the hanging damper 1 and the elevator car body 2. The first rod 11a is arranged to go through the beam 31 of the elevator car sling 3 shown in the figure. This is arranged such that the beam 31 of the elevator car sling 3 comprises a hole having a size that is large enough for the first rod 11a not having a contact with the elevator car sling 3 in a rest position. The rest position is when the elevator is not moving in a vertical direction. The first rod 11a may have a narrowed section in the area that is provided in the hole of the beam 31. In other words the beam of the elevator car sling 3 comprises hole having a diameter that is larger than the diameter of the first rod 11a. The second end 11a2 of the first rod 11a is connected to the first plate 11b. The connection between the first rod 11a and the first plate 11b is preferably a threaded connection. So the first part 11 of the hanging damper comprises a first rod 11a and a first plate 11b connected together preferably through a threaded connection. In another embodiment of the invention the connection between the first rod 11a and the first plate 11b is a welded connection.

The hanging damper 1 also comprises the second part 12 which comprises a second plate 12a and at least one second rod 12b in connection with the second plate 12a. As can be seen from FIG. 3 the second rod 12b goes through the beam 31 of the elevator car sling 3 such that a first end 12b1 of the second rod 12b and a second end 12b2 of the second rod 12b are on different sides of the beam 31. The second rod 12b is arranged in connection with the elevator car sling 3 through a thread nut fixing so that the second rod 12b preferably has a threaded portion in the end of the second rod 12b. In this embodiment the second rod 12b is also arranged in connection with the second plate 12a through a thread nut fixing similarly as described in connection with the beam 31 of the elevator car sling 3. So the second rod 12b preferably comprises a threaded portion in both ends of the second rod 12b or the whole second rod 12b is threaded. The second rod 12b goes through the first plate 11b which has a hole larger than the second rod 12b. The second rod 12b also goes through the damping element 13 arranged between the first plate 11b and the second plate 12a. As the second rod 12b is arranged in connection with the second plate 12a through a thread nut fixing it means that the second rod 12b goes through the second plate 12a as well. In another embodiment of the invention the connection between the second rod 12b and the second plate 12a may be arranged through welding or some other way.

The damping element 13 is arranged between the first plate 11b and the second plate 12a such that by tightening the nut in the first end 12b1 and/or in the second end 12b2 of the second rod 12b the contact between the damping element 13 and the first plate 11b and the second plate 12a can be made tight.

So the first part 11 is connected to the elevator car body 2 and the second part 12 is connected to the elevator car sling 3 and the damping element 13 connects the first part 11 and the second part 12 together such that it is the only connection between the lower part of the elevator car body and the elevator car sling. In other words the first rod 11a is connected from its first end 11a1 to the elevator car body 2 and especially to its beam 21 and from its second end 11a2 to the first plate 11b. The second rod 12b is connected from its first end 12b1 to the elevator car sling 3 and especially to its beam 31 and from its second end 12b2 to the second plate 12a. The first plate 11b and the second plate 12a are isolated from each other through the damping element 13. So the first plate 11b and the second plate 12a are not connected to each other directly but through the damping element 13. The damping element 13 is rubber and/or polyurethane. So the direct connection between the elevator car body 2 and the elevator car sling 3 is replaced by the connection between the first plate 11b and the second plate 12a through the damping element 13. The damping element 13 ensures that the vibrations from the elevator car sling 3 excited by guide rail misalignments, roller, counterweight passing bye, ropes or something else is not transferred straight to the elevator car body and to passengers in it. The damping element 13 in other words attenuates or kill the vibrations.

The elevator car sling 3 has a beam 31 to which the second rod 12b of the hanging damper 1 is connected. As the first rod 11a of the first part 11 goes through the beam 31 has the beam 31 therefore at least two holes from which one is for the first rod 11a and is larger than the first rod 11a so that there is no direct connection with the first rod 11*a* and the beam 31. Preferably there is a covering, a bushing or a padding between the first rod 11*a* and the beam 31 around the area of the hole in the case that the first rod 11*a* and the beam 31 of the elevator car sling 3 accidentally touch during the elevator run in abnormal conditions.

The second rod 12*b* also comprises a soft rubber covering 12*e* between the nut 12*d* and the second plate 12*a* and/or between the nut 12*d* and a baseplate 12*c* which is preferably arranged between the nut 12*d* and the beam 31 of the elevator car sling 3. The baseplate 12*c* is part of the second part 12 of the hanging damper 1.

Mass can be added on each hanging damper 1 in order to balance the elevator car if it is tilted due to heavier doors, top guard or decoration panels. The additional mass is can be placed on top of the first plate 11*b* for example with clamps or with magnet.

An elevator comprises an elevator car body 2 and an elevator car sling 3 and a hanging damper 1.

It will be obvious to a person skilled in the art that, as the technology advances, the inventive concept can be implemented in various ways. The invention and its embodiments are not limited to the examples described above but may vary within the scope of the claims.

The invention claimed is:

1. An elevator car arrangement comprising:
an elevator car body including a beam;
an elevator car sling including a beam; and
a hanging damper connecting the elevator car body and the elevator car sling together for dampening vibrations coming from guide rails through the elevator car sling to the elevator car body, the hanging damper comprising:
   a first part connected to the beam of the elevator car body located at a bottom of the elevator car body;
   a second part connected to the elevator car sling; and
   a damping element arranged to dampen vibrations coming from the second part to the first part and being provided below the beam of the elevator car sling,
wherein the first part comprises a first rod and a first plate connected together, said first rod having a first end directly connected to the beam of the elevator car body and a second end connected to the first plate, wherein the second end of the first rod extends from above the beam of the elevator car sling to below the beam of the elevator car sling,
wherein the second part comprises a second plate and a plurality of second rods, each second rod including a first end and a second end opposite to the first end, the first end of each second rod being connected with the beam of the elevator car sling and the second end of each second rod being connected with the second plate,
wherein the damping element is arranged directly between the first plate of the first part and the second plate of the second part such that the damping element has a direct connection with the first plate of the first part and the second plate of the second part and the connection between the first part and the second part is arranged through the damping element, and
wherein each of the plurality of second rods extends vertically through the damping element.

2. The elevator car arrangement according to claim 1, wherein the connection between the first rod and the elevator car body is a threaded connection.

3. The elevator car arrangement according to claim 2, wherein each second rod is arranged to go through the first plate and the damping element to have a connection with the second plate.

4. The elevator car arrangement according to claim 1, wherein each second rod is arranged to go through the first plate and the damping element to have a connection with the second plate.

5. The elevator car arrangement according to claim 1, wherein the connection between each second rod and the beam of the elevator car sling is a thread nut fixing in connection with the beam.

6. The elevator car arrangement according to claim 1, wherein the first rod is arranged to go through the beam of the elevator car sling without having a connection with the sling.

7. The elevator car arrangement according to claim 1, wherein the arrangement comprises four hanging dampers, two on each side of the elevator car body.

8. The elevator car arrangement according to claim 1, wherein the damping element comprises rubber.

9. The elevator car arrangement according to claim 1, wherein the damping element comprises polyurethane.

10. An elevator comprising the elevator car arrangement according to claim 1.

11. A method for dampening vibrations coming from guide rails through an elevator car sling to an elevator car body, the method comprising the steps of:
providing a hanging damper comprising a first part and a second part between an elevator car body and an elevator car sling by:
   connecting the first part to a beam of the elevator car body located at a bottom of the elevator car body, said first part comprising a first rod and a first plate connected together, said first rod having a first end to be directly connected to the beam of the elevator car body and a second end connected to the first plate, wherein the second end of the first rod extends from above a beam of the elevator car sling to below the beam of the elevator car sling, wherein the beam of the elevator car sling is substantially planar;
   connecting the second part to the elevator car sling, said second part comprising a second plate and a plurality of second rods, each second rod including a first end and a second end opposite to the first end, the first end of each second rod being connected with the beam of the elevator car sling and the second end of each second rod being connected with the second plate;
   arranging a damping element directly between the first plate of the first part and the second plate of the second part, the damping element being directly connected to the first plate of the first part and the second plate of the second part to dampen vibrations coming from the second part to the first part, wherein the damping element is provided below the beam of the elevator car sling; and
connecting the first part and the second part together through the damping element,
wherein each of the plurality of second rods extends vertically through the damping element.

12. The method according to claim 11, wherein the step of connecting the first part to a bottom part of the elevator car body comprises the steps of:
arranging the first rod to go through the beam of the elevator car sling; and connecting the first end of the first rod to the beam of the elevator car body.

13. The method according to claim 11, wherein the step of connecting the second part to the elevator car sling comprises the steps of:
- arranging each second rod through a hole in the beam of the elevator car sling such that the first end of each second rod and the second end of each second rod are on different sides of the beam or on different sides of part of the beam; and
- providing a nut to the first end of each second rod and tightening the nut.

14. The method to claim 11, wherein the step of arranging the damping element between the first plate of the first part and the second plate of the second part comprises the steps of:
- providing a hole in the damping element for each second rod to go through the damping element;
- arranging the damping element in connection with the first plate such that each second rod goes through the damping element;
- arranging the second plate in connection with the damping element, said second plate having a hole for each second rod to go through the second plate; and
- tightening a nut to the second end of each second rod.

15. The method according to claim 11, wherein the method further comprises a step of adding mass to the hanging damper for balancing the elevator car body.

* * * * *